United States Patent
Nowakowski et al.

(10) Patent No.: US 7,858,877 B2
(45) Date of Patent: Dec. 28, 2010

(54) ENCAPSULATING HOUSING FOR AN ELECTRICAL POWER TRANSMISSION DEVICE HAVING A PARTICLE TRAP

(75) Inventors: Andrzej Nowakowski, Berlin (DE); Christian Trempler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 1016 days.

(21) Appl. No.: 11/631,061

(22) PCT Filed: May 24, 2005

(86) PCT No.: PCT/DE2005/000960

§ 371 (c)(1),
(2), (4) Date: Jan. 17, 2007

(87) PCT Pub. No.: WO2006/000178

PCT Pub. Date: Jan. 5, 2006

(65) Prior Publication Data

US 2008/0290739 A1    Nov. 27, 2008

(30) Foreign Application Priority Data

Jun. 28, 2004    (DE) .................. 10 2004 032 018

(51) Int. Cl.
*H01B 9/06*    (2006.01)
(52) U.S. Cl. ................. 174/14 R; 174/50; 218/155
(58) Field of Classification Search ............ 174/14 R, 174/50, 520; 218/155
See application file for complete search history.

(56) References Cited

U.S. PATENT DOCUMENTS

| 4,029,891 | A |   | 6/1977  | Nakata |
|-----------|---|---|---------|--------|
| 4,034,147 | A |   | 7/1977  | Clark et al. |
| 4,042,774 | A | * | 8/1977  | Nakata et al. ............. 174/14 R |
| 4,064,354 | A | * | 12/1977 | Cookson ....................... 174/28 |
| 4,085,807 | A |   | 4/1978  | Bolin |
| 4,088,826 | A |   | 5/1978  | Bolin |
| 4,096,345 | A | * | 6/1978  | Kemeny .................... 174/14 R |
| 4,110,551 | A | * | 8/1978  | Cookson ....................... 174/27 |
| 4,161,621 | A | * | 7/1979  | Bolin et al. ................ 174/14 R |
| 4,256,254 | A | * | 3/1981  | Cookson et al. ............. 228/166 |
| 4,400,578 | A |   | 8/1983  | Cookson et al. |
| 4,440,970 | A | * | 4/1984  | Dale ........................ 174/14 R |
| 4,465,896 | A | * | 8/1984  | Wootton ...................... 174/28 |
| 5,264,660 | A | * | 11/1993 | Dunz .......................... 174/28 |
| 6,307,172 | B1| * | 10/2001 | Bolin et al. ................. 218/155 |
| 7,262,362 | B2| * | 8/2007  | Holaus et al. ............. 174/14 R |

FOREIGN PATENT DOCUMENTS

| CA |      951372   | 7/1974 |
| DE |   247 109 A1  | 6/1987 |
| DE | 41 00 720 A1  | 7/1992 |
| EP |  0 984 289 A1 | 3/2000 |
| JP |    54-140188  | 10/1979 |

\* cited by examiner

*Primary Examiner*—Hung V Ngo
(74) *Attorney, Agent, or Firm*—Laurence A. Greenberg; Werner H. Stemer; Ralph E. Locher

(57) ABSTRACT

A particle trap has a cover cap which dielectrically shields a shielding area by way of a shielding surface. The shielding surface has a concave curvature. Transversely to the concave curvature, the shielding surface has surface regions which are inclined transversely to the concave curvature in the region of a trough of the concave curvature.

10 Claims, 6 Drawing Sheets

ENCAPSULATING HOUSING FOR AN ELECTRICAL POWER TRANSMISSION DEVICE HAVING A PARTICLE TRAP

BACKGROUND OF THE INVENTION

Field of the Invention

The invention relates to a particle trap which has a covering shroud with a shielding surface for dielectric shielding of a shielding area, for an encapsulation housing of an electrical power transmission device, with the shielding surface having concave curvature with a low point.

A particle trap such as this is known, for example, from German Laid-Open Specification DE 41 00 720 A1. In the arrangement there, an electrical conductor is arranged within a tubular encapsulation housing. Two metallic half-shells are arranged in the bottom area of the encapsulation housing. The metallic half-shells form a longitudinal groove. This longitudinal groove forms a weak-field area which is used to hold particles.

In the case of the known particle trap, the half-shells must be positioned and aligned with respect to one another over a wide range. Although the metallic half-shells form a large catchment area for particles, so that particles can be trapped even when the encapsulation housing there is tilted or twisted, this arrangement has the disadvantage, however, that the longitudinal groove which is formed between the shells occupies a comparatively narrow section in the bottom area. For example, this means that it is possible for the longitudinal groove to be located at the side on tilting. The particles can thus no longer slide into the longitudinal groove. The longitudinal groove therefore cannot carry out the function of passing on or final shielding of particles.

SUMMARY OF THE INVENTION

The present invention is based on the object of designing a particle trap for an encapsulation housing for an electrical power transmission device of the type mentioned in the introduction, in such a manner that the particle trap is still effective even when the encapsulation housing is tilted.

For a particle trap of the type mentioned in the introduction, the object is achieved according to the invention in that the shielding surface has at least one surface area which falls transversely with respect to the concave curvature, in the area of the low point.

The concave curvature means that particles which can accumulate within broad area sections are passed to a low point in the concave curvature of the shielding surface. For example, in this case, the low point can match the apex point of the concave curvature, but may also differ from this as soon as the shielding surface, which has concave curvature, is arranged in a tilted form. At least one trapping surface area, which is arranged in the area of the low point and runs transversely with respect to the concave curvature, allows the particles to be passed on quickly from the shielding surface. This design means that it is no longer necessary to provide the shielding surface itself with openings for the particles. It is thus possible to design the shielding surface to be more homogeneous. The combination of concave curvature and a surface area which falls away transversely makes it possible for the particles to be carried away from the shielding surface quickly, and to come to rest in dielectrically shielded areas. In this case, it is particularly advantageous for surfaces which fall away on both sides to be provided on the concave surface.

This results in a uniformly shaped covering shroud which can be manufactured easily and can be used at different positions within an encapsulation housing. For example, the concave curvature means that it is possible to use one and the same encapsulation housing with one and the same covering shroud in differently tilted positions. The concave curvature of the shielding surface ensures that particles are collected, irrespective of the orientation. The surface areas which fall away transversely with respect to the curvature also mean that particles are still passed on quickly from the shielding surface when the housing is tilted.

A further advantageous refinement makes it possible to provide for the shielding surface to be shaped in the form of a saddle surface.

Because of its shape, a saddle surface is able to ensure that foreign particles run away from the shielding surface even when it is tilted. Since a surface such as this can be described unambiguously in a mathematical form, the extents and radii of curvature of the individual surface areas can easily be modified and adapted.

Furthermore, it is advantageously possible to provide for the shielding surface to have a greater extent in the direction of the concave curvature than in the direction of the falling surface area.

When a covering shroud for a particle trap is designed in this way, it is possible to use relatively narrow surfaces with concave strip-like curvature. These narrow covering shrouds can also easily be arranged at constrictions within a housing. Despite their small dimensions, they also have the advantage that they ensure that particles are carried away reliably into the area that is shielded by the shielding surface when the housing is tilted or is at an angle.

A further advantageous refinement makes it possible to provide for the shielding surface on the encapsulation housing to cover a depression, leaving an entry opening free.

The use of a depression for a particle trap makes it possible to use the covering shroud to model or to accommodate the shape of the inner wall of the encapsulation housing around the depression. This results in a homogeneous inner surface of the encapsulation housing. The internal contour of the encapsulation housing is now only slightly adversely affected by the necessary entry opening. However, this can be reduced to a minor extent by rounding off the edges. For example, it is possible to provide in this way for the covering shroud together with the shielding surface to be matched to the predetermined internal shape of the encapsulation housing in such a manner that the depression is closed, leaving a small opening free. The depression increases the capacity of the particle trap. The depression makes it more difficult for particles that have been trapped to slide out of the particle trap inadvertently.

Furthermore, it is advantageously possible to provide for the entry opening to be a circumferential gap around the shielding surface.

A circumferential gap around the shielding surface represents a comparatively large entry opening. The particles can now be trapped directly in the particle trap from all areas or directions. In this case, the shielding shroud can be attached in such a manner that supporting elements are arranged centrally in the depression, and the covering shroud is attached to them, for example by means of screws or welding processes. The covering shroud then extends like the shield over the shielding area, which is advantageously located in the depression.

A further advantageous refinement makes it possible to provide for the encapsulation housing to be the housing of a high-voltage circuit breaker which has an essentially tubular cross section, with the housing having a constriction, which reduces the cross section, in a central section.

High-voltage circuit breakers are subject to severe mechanical loads because of the switching power levels they have to cope with. These loads result in vibration of the encapsulation housing. This makes it possible for particles which would have a dielectrically disadvantageous effect to become detached, for example, from active parts or from surfaces of the encapsulation housing. The restriction in the central area of the housing forces particles that occur to migrate into the edge areas of the encapsulation housing where dielectrically better areas are located, since the interrupter unit is generally located centrally in the circuit-breaker housing. The constriction reduces the diameter of the tubular encapsulation housing. By way of example, it is particularly advantageous to be able to tilt the housing about the longitudinal axis, while still ensuring that the particle trap is completely effective. This effectiveness is further assisted by the reduced cross section in the central section.

It may be advantageous for a first and a second particle trap to each be arranged in one of the end areas of the housing.

If a first and a second particle trap are each arranged in the end areas of the housing, the distance that the particles have to travel before entering a field shadow is reduced. Furthermore, this increases the capacity within the housing, since two particle traps are now available.

It may also be advantageous to arrange a housing flange essentially diametrically opposite the particle trap on the encapsulation housing.

The arrangement of an opposite housing flange makes it possible to prepare for the installation of the particle trap, and to carry out this installation, through this flange. This results in easy assembly, which can be carried out at high speed. Furthermore, for example, the housing flange can be used to introduce a conductor, for example by means of outdoor bushings, into the interior of the encapsulation housing.

BRIEF DESCRIPTION OF THE DRAWINGS

The invention will be described in more detail in the following text on the basis of one exemplary embodiment, and is illustrated schematically in a drawing, in which.

DESCRIPTION OF THE PREFERRED EMBODIMENTS

Figure 1:
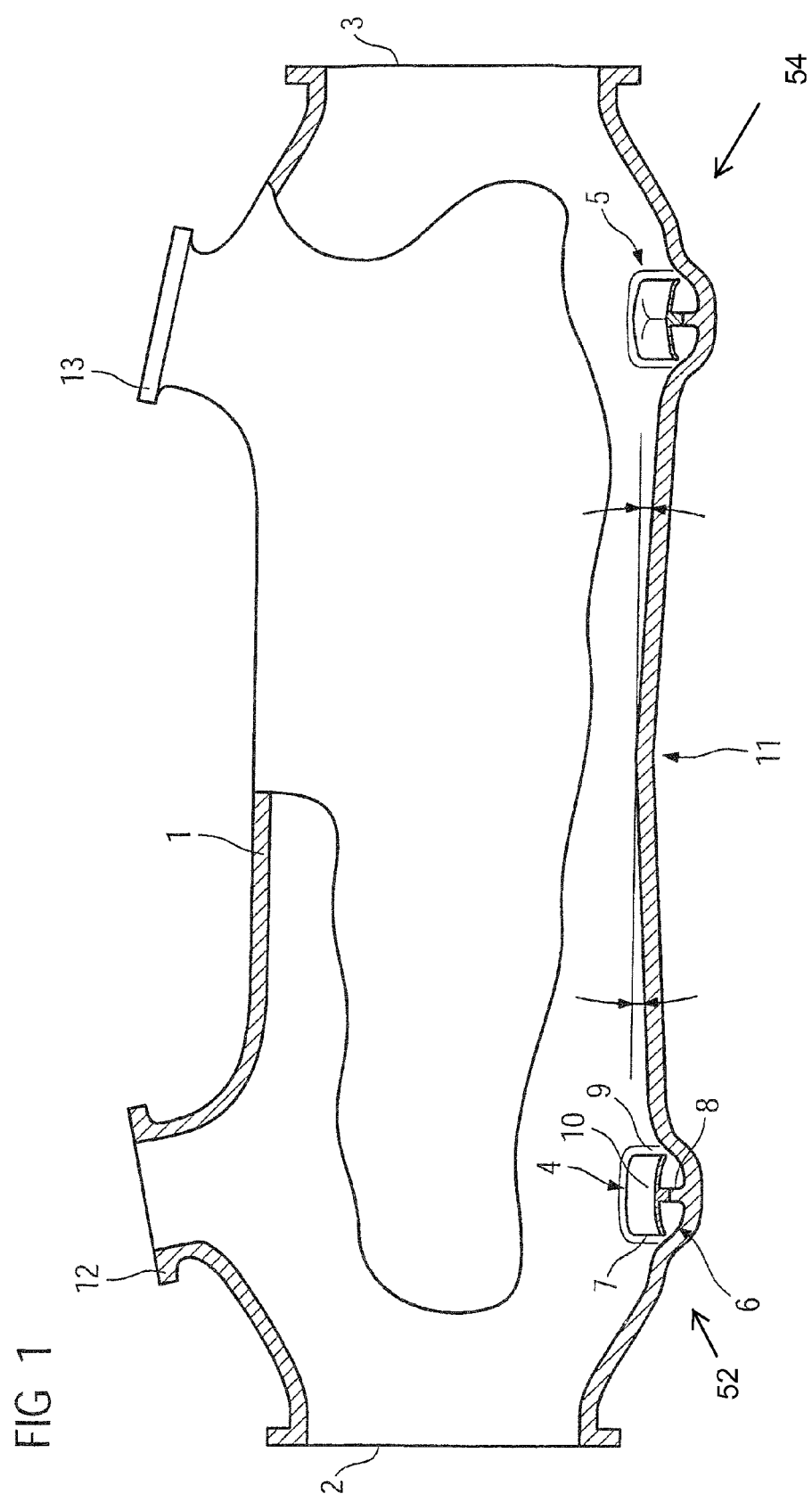
FIG. 1 shows a housing of a high-voltage circuit breaker with a first and a second particle trap.

FIG. 1 shows a partially cutaway encapsulation housing 1 for a high-voltage circuit breaker. The encapsulation housing 1 has an essentially tubular basic structure. Flange openings 2, 3 are arranged at the ends on the encapsulation housing 1. An interrupter unit, bearing elements etc. can be introduced into the encapsulation housing 1 through the flange openings 2, 3. The flange openings 2, 3 can be closed by means of flange covers. A first particle trap 4 as well as a second particle trap 5 are arranged in the bottom area of the encapsulation housing 1. By way of example, their design and function will be described with reference to the first particle trap 4. The second particle trap 5 is designed to be essentially identical. Only the configuration of the covering shroud differs from the configuration of the first particle trap 4. The first particle trap 4 is arranged on a depression 6 in the encapsulation housing 1. The depression 6 is stamped out of the curved bottom area of the encapsulation housing 1, and is covered by a covering shroud 7. The covering shroud 7 is attached to a connecting piece 8 which is arranged in the interior of the depression 6. The covering shroud 7 has a curved structure which accommodates and approximately models the curvature of the encapsulation housing 1. In this case, the covering shroud 7 is designed such that an entry opening is formed, in the form of a circumferential gap 9 around the covering shroud 7. The covering shroud 7 has a shielding surface 10. The shielding surface 10 dielectrically shields the area located underneath it in the direction of the depression 6. The shielding surface 10 has concave curvature in a direction running at right angles to the plane of the drawing. A falling surface area 58 (See FIG. 2) is arranged at the inflection point 56 (See FIG. 2), namely the low point of the concave curvature on the shielding surface 10, transversely with respect to the concave curvature. In the present case, the falling surface area is designed in such a manner that, in conjunction with the concave curvature, the shielding surface 10 is in the form of a saddle surface. This configuration ensures that particles that fall onto the shielding surface 10 fall into the circumferential gap 9, driven by the force of gravity. This is also the case when the encapsulation housing assumes rotated or tilted positions. In contrast to this, in the case of the second particle trap 5, the low point of the concave curvature of the shielding surface 10 is configured in such a manner that surface areas fall away on both sides. Furthermore, it is also possible to provide for the covering shroud 7 itself to be arranged at an angle above the depression 6, thus creating a preferred direction for particles to run away in.

The first particle trap 4 and the second particle trap 5 are each arranged on one of the end areas 52, 54 of the encapsulation housing 1. Centrally, the encapsulation housing 1 has a constriction 11. This constriction 11 provides the bottom area of the encapsulation housing with a gradient, so that particles in each case migrate to one of the particle traps 4, 5, driven by the force of gravity. Furthermore, the end areas of the encapsulation housing 1 are conical, so that any particles which occur in this area as well can migrate in the direction of the particle traps 4, 5. A first and a second housing flange 12, 13 are respectively arranged approximately diametrically opposite the particle traps 4, 5. By way of example, outdoor bushings can be flange-connected to the housing flanges 12, 13, and are used to feed electrical cables into the interior of the encapsulation housing 1. Undesirable particles occur, for example, at joints, bearing bushings, plug connections and other parts which mechanically rub against one another. The arrangement underneath the housing flanges allows particles to fall directly into the particle traps 4, 5. They therefore quickly move to dielectrically shielded areas, thus preventing the occurrence of particle discharges or other disturbances to the electrical field. Furthermore, installation work can be carried out on the particle traps 4, 5 via the first and the second housing flanges 12, 13.

Figure 2:
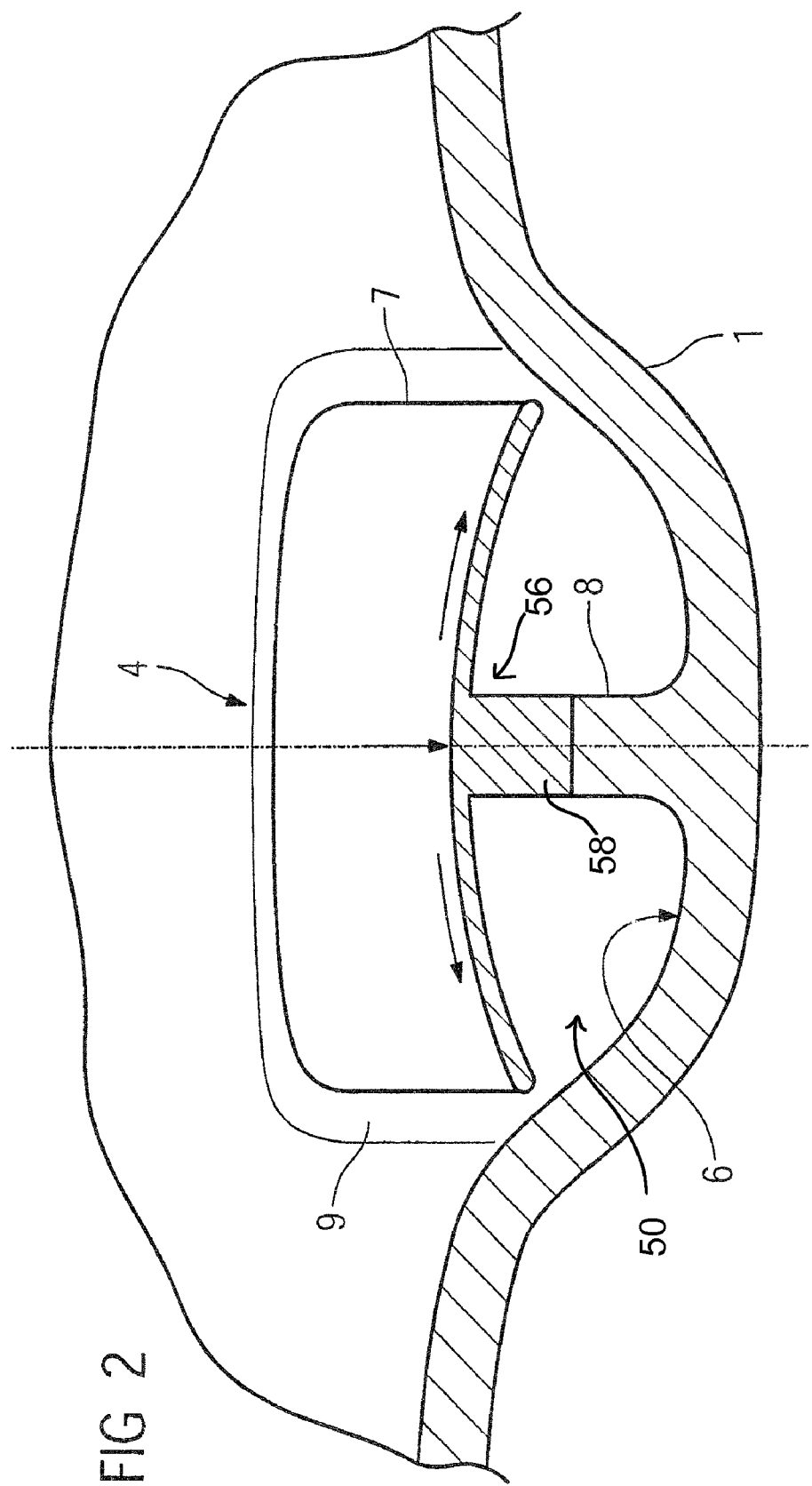
FIG. 2 shows a section through the first particle trap transversely with respect to the concave curvature.

FIG. 2 shows an enlarged illustration of the first particle trap 4, showing the depression 6 over which the covering shroud 7 extends. The figure also shows the low point of the concave curvature, from which the falling surface areas extend. The encapsulation housing 1 and the covering shroud 7 are made of electrically conductive material, and both are at the same potential. This is generally a ground potential. This results in an electrode arrangement which forms an area without any field in the interior of the particle trap. Particles such as metal swarf, paint flakes, dust and other dirt can be deposited in this area in which there is no field.

Figure 3:
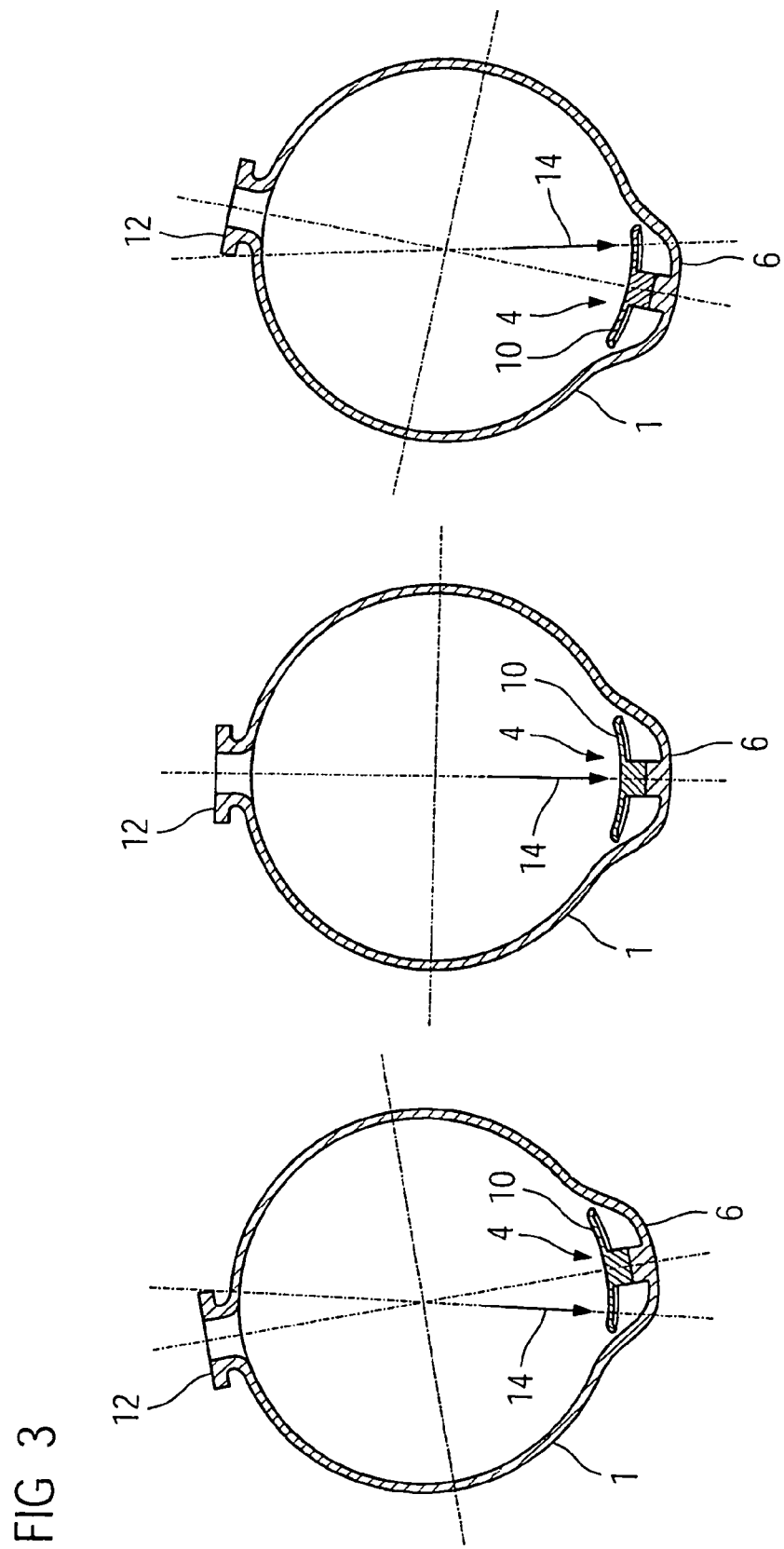
FIG. 3 shows a section through the particle trap along the concave curvature.

FIG. 3 shows a section through the encapsulation housing 1 illustrated in FIG. 1. The section plane is at right angles to the plane of the drawing in FIG. 1. The figure shows the concave curvature of the shielding surface 10 of the first particle trap 4. The low point of the shielding surface is in each case different (see arrow 14) depending on the extent to which the encapsulation housing 1 is deflected from the vertical. However, the surface areas which fall away transversely with respect to the concave curvature always ensure, irrespective of the deflection, that particles which come into contact with the shielding surface can slide away into the shielded area 50 of the particle trap. In this case, provision is made for the shielding surface to have a greater extent in the direction of the concave curvature (in the direction of the section plane in FIG. 3) than in the direction of the falling surface areas (section plane in FIG. 1). This results in a narrow covering shroud 7, which can be fitted at a large number of positions on an encapsulation housing 1. In a plan view, this therefore gives the impression of a narrow elongated strip, with appropriate rounded areas.

Figure 4:
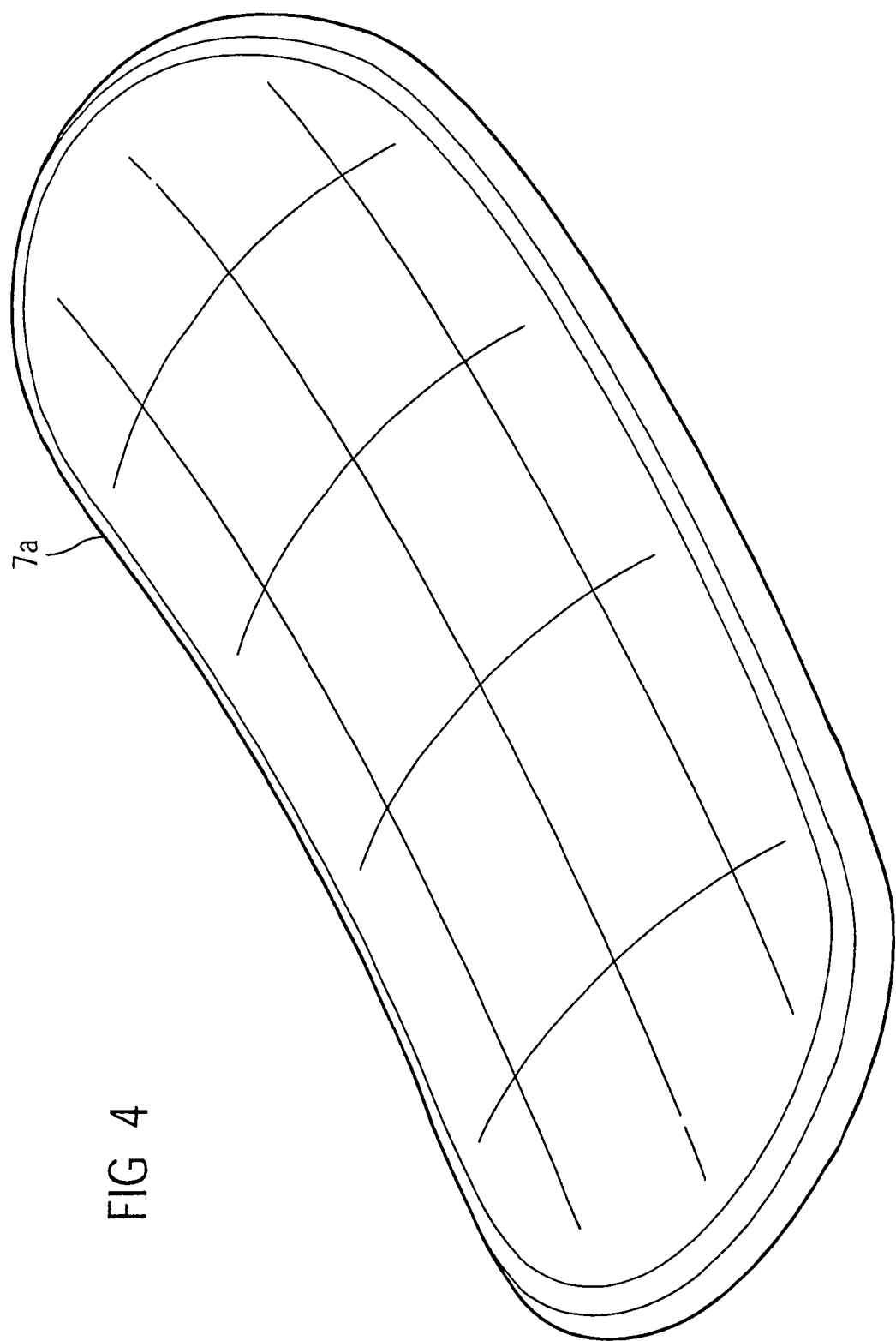
FIG. 4 shows a perspective view of a covering shroud.
Figure 5:
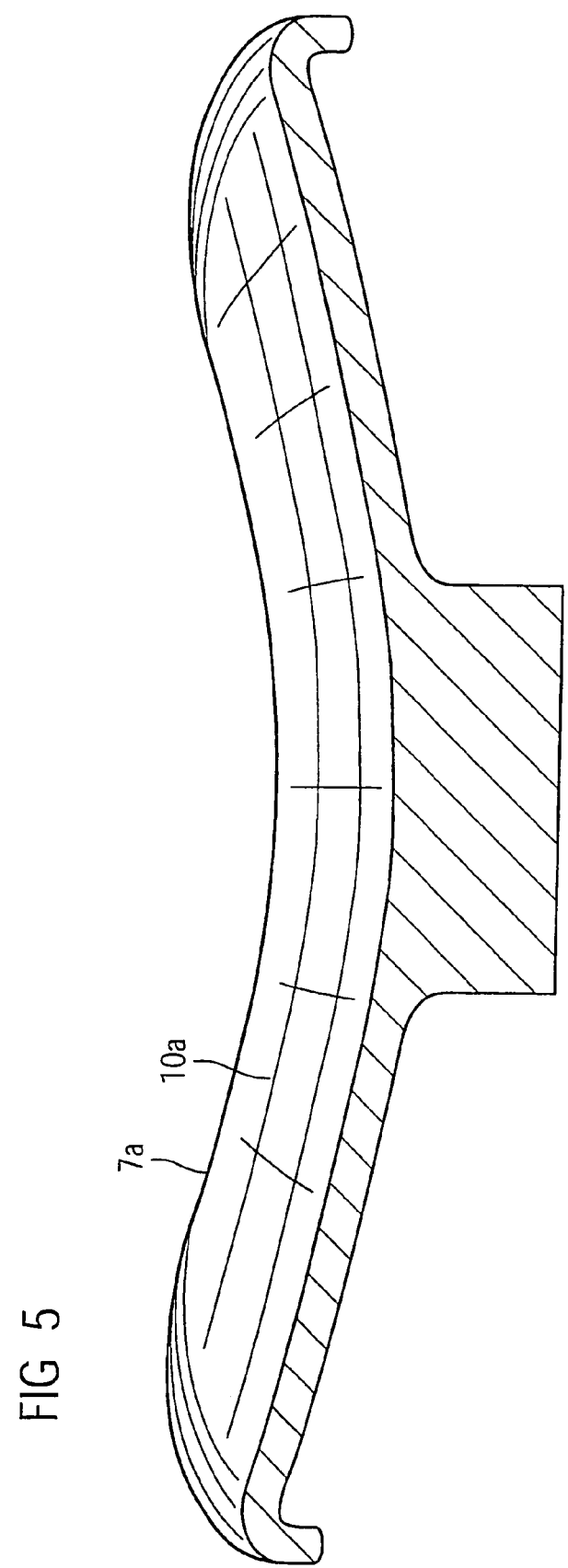
FIG. 5 shows a perspective view of the covering shroud with a section along the concave curvature.
Figure 6:
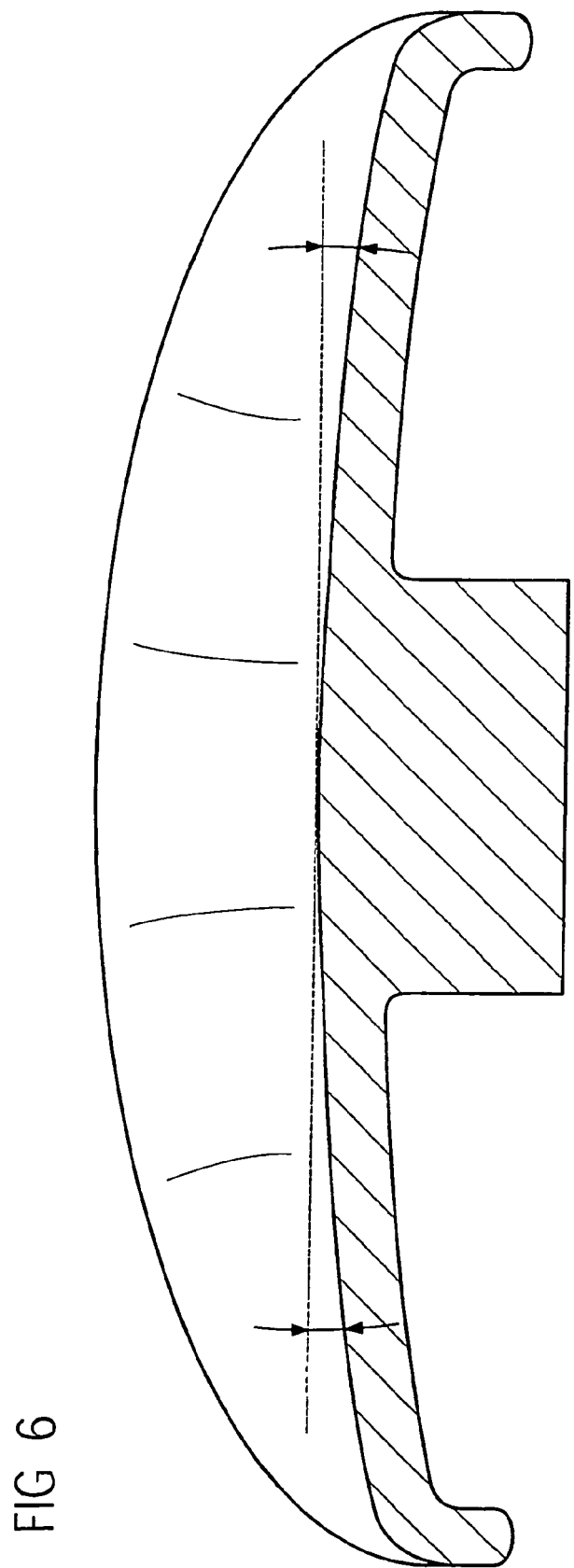
FIG. 6 shows a perspective view of the covering shroud with a section transversely with respect to the concave curvature.

By way of example, FIG. 4 shows a refinement variant of a covering shroud 7a, which has concave curvature and is rounded at its free ends. The concave shape of the shielding surface 10a can be seen in FIG. 5. The shielding surface 10a has surface areas which run transversely with respect to the concave curvature and these are designed to fall away on both sides like a lectern (FIG. 6). Mutually abutting areas are designed such that they merge into one another in a rounded form.

We claim:

1. In an encapsulation housing of an electrical power transmission device, a particle trap, comprising:
    a covering shroud formed with a shielding surface for dielectrically shielding a shielding area in the encapsulation housing;
    said shielding surface having a concave curvature formed with a low point; and
    said shielding surface having at least one surface area falling transversely with respect to said concave curvature, in an area of said low point;
    wherein the encapsulation housing is formed with a depression and said shielding surface spans the depression, and said shielding surface is disposed to form an entry opening between said shielding surface and said housing.

2. The particle trap according to claim 1, wherein said entry opening is a circumferential gap around said shielding surface.

3. The particle trap according to claim 1, wherein the low point is a point of inflection of said concave curvature.

4. In an encapsulation housing of an electrical power transmission device, a particle trap, comprising:
    a covering shroud formed with a shielding surface for dielectrically shielding a shielding area in the encapsulation housing;
    said shielding surface having a concave curvature formed with a low point; and
    said shielding surface having at least one surface area falling transversely with respect to said concave curvature, in an area of said low point;
    wherein the encapsulation housing is a housing of a high-voltage circuit breaker formed with a substantially tubular cross section, and having a constriction in a central section thereof, reducing a cross section thereof.

5. An encapsulation housing of an electrical power transmission device, comprising:
    a housing formed with two end areas each having a shielding area;
    a respective particle trap disposed near each said end area for shielding said shielding area, said particle trap including:
    a covering shroud formed with a shielding surface for dielectrically shielding the shielding area in said housing;
    said shielding surface having a concave curvature formed with a low point; and
    said shielding surface having at least one surface area falling transversely with respect to said concave curvature, in an area of said low point.

6. The encapsulation housing according to claim 5, wherein said housing is formed with a housing flange arranged substantially diametrically opposite each said particle trap.

7. The encapsulation housing according to claim 5, wherein said housing is formed with a depression and said shielding surface spans said depression, and said shielding surface is disposed to form an entry opening between said shielding surface and said housing.

8. The encapsulation housing according to claim 7, wherein said entry opening is a circumferential gap around said shielding surface.

9. The encapsulation housing according to claim 5, wherein said housing is configured as a housing of a high-voltage circuit breaker formed with a substantially tubular cross section, and having a constriction in a central section, reducing a cross section thereof.

10. The encapsulation housing according to claim 5, wherein the low point is a point of inflection of said concave curvature.

* * * * *